(12) United States Patent
Cho et al.

(10) Patent No.: US 12,409,628 B2
(45) Date of Patent: Sep. 9, 2025

(54) PAPER LID FOR FOOD CONTAINER AND METHOD OF MANUFACTURING THE SAME

(71) Applicant: GOLDENPACKAGE CO., LTD., Gimpo-si (KR)

(72) Inventors: In Seok Cho, Bucheon-si (KR); Dong Chul Lee, Bucheon-si (KR)

(*) Notice: Subject to any disclaimer, the term of this patent is extended or adjusted under 35 U.S.C. 154(b) by 0 days.

(21) Appl. No.: 18/008,290

(22) PCT Filed: Jan. 5, 2022

(86) PCT No.: PCT/KR2022/000123
§ 371 (c)(1),
(2) Date: Dec. 5, 2022

(87) PCT Pub. No.: WO2023/132378
PCT Pub. Date: Jul. 13, 2023

(65) Prior Publication Data
US 2024/0009952 A1    Jan. 11, 2024

(51) Int. Cl.
*B31B 50/81* (2017.01)
*B31B 50/59* (2017.01)
*B65D 43/02* (2006.01)

(52) U.S. Cl.
CPC ............ *B31B 50/81* (2017.08); *B31B 50/592* (2018.05); *B65D 43/0212* (2013.01);
(Continued)

(58) Field of Classification Search
CPC ... B31B 50/81; B31B 50/592; B65D 43/0212; B65D 2543/00092; B65D 2543/00268;
(Continued)

(56) References Cited

U.S. PATENT DOCUMENTS 5,766,709 A * 6/1998 Geddes .................... B65D 3/22
428/36.5
2011/0193264 A1* 8/2011 Li .......................... B29C 43/003
264/318
(Continued)

FOREIGN PATENT DOCUMENTS

JP   2017513781 A   6/2017
KR   200358319 Y1  8/2004
(Continued)

*Primary Examiner* — Gloria R Weeks
*Assistant Examiner* — Scott A Howell
(74) *Attorney, Agent, or Firm* — NKL Law; Jae Youn Kim

(57) ABSTRACT

Disclosed is a method of manufacturing a paper lid for a food container, the method including a blanking step of cutting out lid molding paper having radial wrinkles at the edge thereof from base paper having upper and lower surfaces, each of which is treated with a synthetic resin coating, a primary molding step of molding the paper lid including a cover plate and a skirt wall bent downwards along the edge of the cover plate, and a secondary molding step of forming a guide part obtained by bending a large diameter part of the skirt wall so as to be inclined outwards, the guide part guiding coupling with the upper portion of the food container, and molding a curling tight-contact part configured to tightly surround the outside of a reinforcement frame of the food container by curling the upper end of the guide part in the inward direction.

3 Claims, 11 Drawing Sheets

(52) U.S. Cl.
CPC .............. *B65D 2543/00092* (2013.01); *B65D 2543/00268* (2013.01); *B65D 2543/00537* (2013.01); *B65D 2543/00638* (2013.01); *B65D 2543/00685* (2013.01); *B65D 2543/00731* (2013.01); *B65D 2543/00796* (2013.01)

(58) Field of Classification Search
CPC ........... B65D 2543/00537; B65D 2543/00638; B65D 2543/00685; B65D 2543/00731; B65D 2543/00796
See application file for complete search history.

(56) References Cited

U.S. PATENT DOCUMENTS

| | | | |
|---|---|---|---|
| 2014/0054306 A1 | 2/2014 | Panek et al. | |
| 2014/0224822 A1* | 8/2014 | Song | B65D 43/0212 220/780 |
| 2016/0000243 A1* | 1/2016 | Tedford, Jr. | A47G 19/2205 220/254.1 |
| 2016/0083151 A1* | 3/2016 | Stahlecker | B65D 43/0222 493/379 |
| 2018/0086511 A1* | 3/2018 | Lin | D21J 3/10 |
| 2020/0032460 A1* | 1/2020 | Lin | B65D 43/0208 |
| 2021/0090796 A1* | 3/2021 | Kjellander | B32B 3/08 |
| 2021/0237387 A1* | 8/2021 | Tanaka | B65D 43/0218 |
| 2021/0237945 A1* | 8/2021 | Tanaka | B65D 43/0218 |
| 2022/0063895 A1* | 3/2022 | Hatje | B65D 43/02 |
| 2024/0092541 A1* | 3/2024 | Takano | B65D 43/0202 |

FOREIGN PATENT DOCUMENTS

| | | |
|---|---|---|
| KR | 102112248 B1 | 5/2020 |
| KR | 102144398 B1 | 8/2020 |
| KR | 102349689 B1 | 1/2022 |

* cited by examiner

PAPER LID FOR FOOD CONTAINER AND METHOD OF MANUFACTURING THE SAME

TECHNICAL FIELD

The present invention relates to a paper lid for a food container and a method of manufacturing the same, and more particularly to a paper lid for a food container and a method of manufacturing the same, configured to increase strength of the food container by curling the edge of the paper lid using an eco-friendly paper material and to be reliably applied to the food container.

BACKGROUND ART

In general, a food container is applied to various fields. For example, the food container is used to contain food (instant food) such as cup noodles and a beverage such as water or take-out coffee. Recently, a disposable food container made of a paper material has been used to solve environmental problems.

In addition, a lid used for the disposable paper container is also made of a paper material in consideration of environmental problems. In Korea Patent Registration No. 10-0568560 (entitled "paper lid with improved compatibility"), disclosed is a paper lid structure manufactured using a paper material and configured not only to maintain a stable coupling state with a cup container but also to improve product design.

As shown in FIG. 1, the paper lid with improved compatibility disclosed in Korea Patent Registration No. 10-0568560 has a lid body structure including a flange part 20 bent downwards and formed to extend in the vertical direction along the peripheral edge of a main body part 10 forming a circular planar shape, wrinkled grooves 21 formed along the flange part 20 at a predetermined distance, and a detachable groove 11 formed along the inner corner portion where the flange part 20 and the main body part 10 meet. Therefore, in the process of coupling the lid body to a cup container 30, even if the diameter of a curling part 31 of the cup container 30 is slightly different depending on the cup container 30, the size of the flange part 20 is changed depending on the diameter of the curling part 31, thereby having an effect of improving compatibility.

However, in the structure of the "paper lid with improved compatibility" as described above, since the size of the flange part 20 is changed, there is a disadvantage in that the lid body may be easily separated from the curling part 31 of the cup container 30 and the contents of the cup container 30 may be poured out. Particularly, since only the upper end of the curling part 31 of the cup container 30 is accommodated in the detachable groove 11 of the lid body to maintain a close contact state therebetween, there is a limit to increasing airtightness. Further, in consideration of compatibility, since the detachable groove 11 is formed along the inner corner portion where the flange part 20 and the main body part 10 meet, the lid body may be easily detached from the cup container 30.

DISCLOSURE

Technical Problem

Therefore, the present invention has been made in view of the above problems, and it is an object of the present invention to manufacture a paper lid capable of covering a food container with paper having a predetermined thickness and to provide "the paper lid for the food container and a method of manufacturing the same", configured to more stably maintain a coupling state between the paper lid and a curling part (reinforcement frame) of the food container by improving an edge structure of the paper lid and to significantly improve strength of the food container.

Technical Solution

In accordance with an aspect of the present invention, the above and other objects can be accomplished by the provision of a method of manufacturing a paper lid for a food container, the paper lid covering an upper portion of the food container having a reinforcement frame formed at an uppermost portion of a wall surface and curled outwards so as to have a circular cross-sectional shape, the method including a blanking step of cutting out a lid molding paper having a size capable of molding the paper lid from base paper having upper and lower surfaces, each of which is treated with a synthetic resin coating having a thickness of 10 to 35 microns, and forming wrinkles radially on an edge of the lid molding paper so as to facilitate molding of the paper lid, a primary molding step of supplying the lid molding paper made in the blanking step to a primary molding device, compressing, while applying heat to the lid molding paper at temperature of 100° C. to 140° C., the lid molding paper to mold the paper lid including a cover plate configured to cover the open upper portion of the food container while being spaced apart from the open upper portion and a skirt wall bent downwards along an edge of the cover plate and coupled to the food container so as to surround an outside of the reinforcement frame of the food container, and bending the skirt wall so as to form a small diameter part connected to the edge of the cover plate, the small diameter part having a lower end in contact with an upper end of the food container, and a large diameter part formed to expand in diameter while forming a round-shaped stepped part configured to allow the lower end of the small part to contact an upper end of the reinforcement frame of the food container, the large diameter part surrounding an outside of the upper end of the food container while being spaced apart from the outside thereof, and a secondary molding step of moving the paper lid made in the primary molding step to a secondary molding device, forming, while applying heat to the paper lid at temperature of 100° C. to 140° C., a guide part obtained by bending the large diameter part of the skirt wall so as to be inclined outwards in a direction toward a lower end thereof, the guide part guiding coupling with the upper portion of the food container, and molding a curling tight-contact part configured to tightly surround the outside of the reinforcement frame of the food container by curling an upper end of the guide part in an inward direction so as to have a semicircular round cross-sectional shape while the upper end thereof is connected to the round-shaped stepped part.

Further, the synthetic resin coating may be made of at least one of polyethylene (PE), polypropylene (PP), polylactic acid (PLA), polyethylene terephthalate (PET), or silicone.

Additionally, a cover reinforcement part may be molded in the primary molding step, the cover reinforcement part being concavely recessed downwards at a central portion of the cover plate.

In accordance with another aspect of the present invention, there is provided a paper lid for a food container manufactured by the above-described method, wherein the paper lid is manufactured by cutting out lid molding paper from base paper and allowing the lid molding paper to pass through a primary molding step and a secondary molding step.

Advantageous Effects

According to a paper lid for a food container of the present invention and a method of manufacturing the same, the paper lid capable of covering the food container is formed with paper having a predetermined thickness, and a skirt wall formed on the edge of the paper lid includes a small diameter part in contact with the upper end of the food container, a guide part formed by bending a large diameter part extending from the lower end of the small diameter part so as to be inclined outwards in the direction toward the edge thereof, the guide part guiding coupling between the paper lid and the upper portion of the food container, and a curling tight-contact part configured to tightly surround the outside of a reinforcement frame of the food container by curling the end of the small diameter part and the boundary portion of the large diameter part in the inward direction so as to have a semicircular round cross-sectional shape. Therefore, there is an advantage in that, when the upper portion of the food container is covered with the paper lid, the curling tight-contact part provided in the middle of the skirt wall may stably cover the open upper portion of the food container by entirely surrounding the outside of the reinforcement frame of the food container. In addition, the guide part, formed at the edge of the skirt wall and molded to be inclined outwards, has an effect of allowing the paper lid to smoothly cover the food container downwards from the upper portion of the food container.

Further, according to the method of manufacturing the paper lid for the food container of the present invention, a synthetic resin coating is made of at least one of polyethylene (PE), polypropylene (PP), polylactic acid (PLA), polyethylene terephthalate (PET), or silicone. Since the paper lid is manufactured while applying heat thereto at the temperature of 100° C. to 130° C. in the primary and secondary molding steps, there is an advantage in that the paper lid may be molded more easily and stably.

Additionally, according to the method of manufacturing the paper lid for the food container of the present invention, bending strength is increased by molding a cover reinforcement part concavely recessed downwards at the central portion of a cover plate, thereby having an effect of further improving product reliability of the paper lid.

DESCRIPTION OF DRAWINGS

The above and other objects, features and other advantages of the present invention will be more clearly understood from the following detailed description taken in conjunction with the accompanying drawings, in which.

REFERENCE NUMBER LIST

Figure 1:
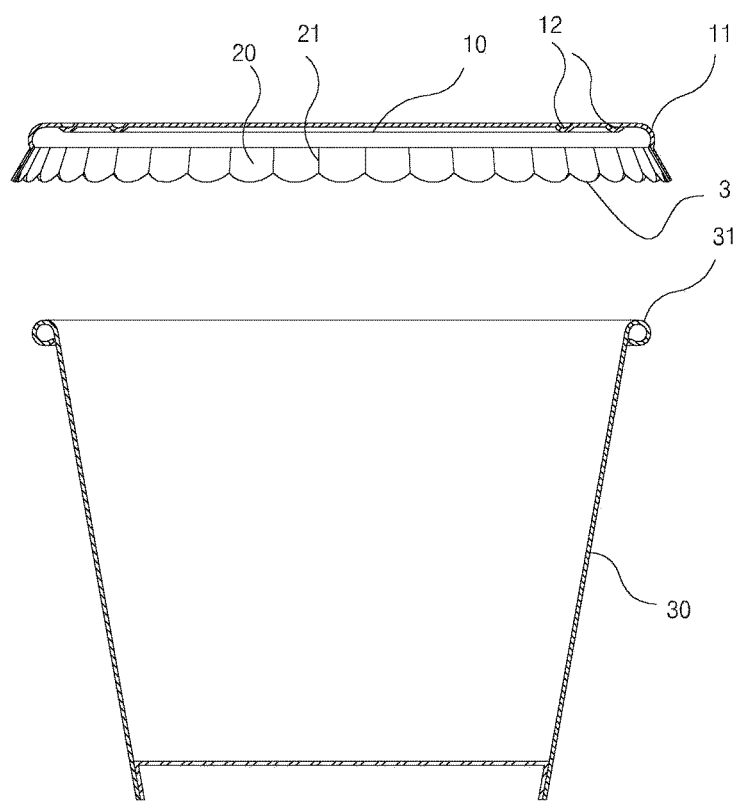
FIG. 1 is a diagram showing a paper lid with improved compatibility disclosed in Korean Patent Registration No. 10-0568560.

100: food container 110: wall surface 111: reinforcement frame
120: bottom 200: paper lid 210: cover plate
211: cover reinforcement part 220: skirt wall 221: small diameter part
222: stepped part 223: large diameter part 224: guide part
225: curling tight-contact part 300: base paper 310: paper pulp
320: synthetic resin coating 330: lid molding paper 331: wrinkle
400: primary molding device 500: secondary molding device S10: blanking step
S20: primary molding step S30: secondary molding step Best Mode Reference will now be made in detail to the preferred embodiments of the present invention, examples of which are illustrated in the accompanying drawings. Wherever possible, the same reference numbers will be used throughout the drawings to refer to the same or like parts.

Hereinafter, one preferred embodiment according to the present invention will be described in detail with reference to the accompanying drawings.

<Description of the configuration of a paper lid according to the present invention>

Figure 2:
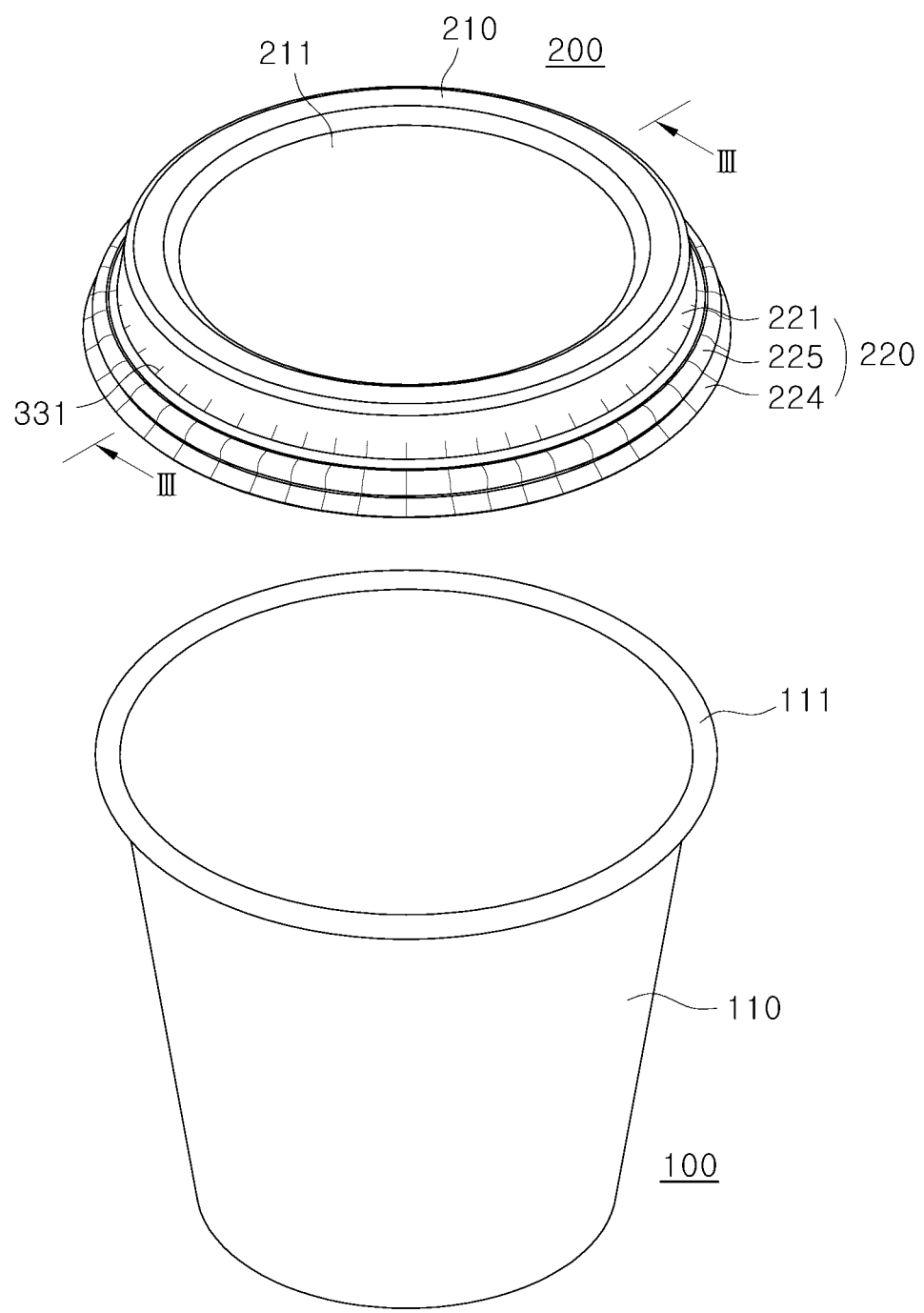
FIG. 2 is a perspective view showing a food container to which the present invention is applied and a paper lid for the food container according to the present invention.
Figure 3:
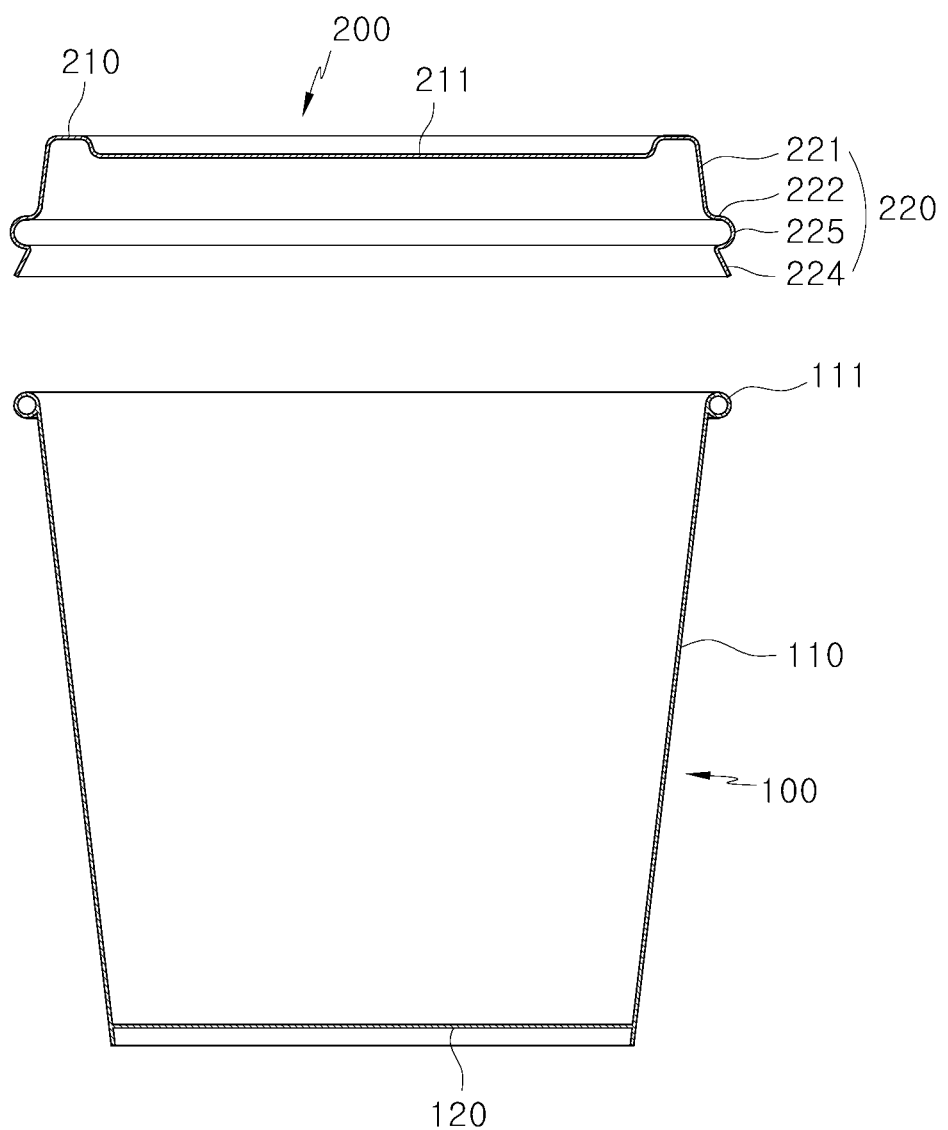
FIG. 3 is a cross-sectional view taken along line III-III in FIG. 2.

First, as shown in FIGS. 2 and 3, a food container 100 to which the present invention is applied is formed of a cylindrical wall surface 110 and a bottom 120 made of paper. The uppermost portion of the wall surface 110 has a reinforcement frame 111 curled outwards so as to have a circular cross-sectional shape. Here, the wall surface 110 of the food container 100 has a tapered tube shape formed by rolling single-layer paper pulp so as to have a wider upper portion and a gradually narrow lower portion and overlapping the opposite ends of the paper to bond the same together. In this case, the upper portion has the reinforcement frame 111 rolled outwards and provided to increase strength of the food container.

A paper lid 200 according to the present invention applied to the food container 100 as described above is molded through lid molding paper acquired from base paper by cutting out the same so as to have radial wrinkles on the edge thereof. The paper lid 200 includes a cover plate 210 configured to cover an open upper portion of the food container 100 while being spaced apart from the open upper portion, and a skirt wall 220 bent along the edge of the cover plate 210 and coupled to the food container 100 so as to surround the outside of the reinforcement frame 111 of the food container 100. A cover reinforcement part 211 concavely recessed downwards is formed at the center of the cover plate 210 of the paper lid 200. Further, the skirt wall 220 of the paper lid 200 includes a small diameter part 221 connected to the edge of the cover plate 210 and configured to contact the upper end of the food container 100, a guide part 224 (large diameter part) formed to have a step at the end of the small diameter portion 221 and configured to expand in diameter to surround the outside of the uppermost end of the food container 100 while being spaced apart therefrom, and a curling tight-contact part 225 configured to tightly surround the outside of the reinforcement frame 111 of the food container 100 by curling the end of the small diameter part 221 and a boundary portion of the guide part 224 in the inward direction so as to have a round cross-sectional shape.

In order to make the paper lid 200 of the food container according to the present invention, a lid molding paper having a disc shape and a size capable of molding the paper lid 200 is cut out from base paper, which is sanitary and eco-friendly single-layer paper pulp, and these pieces of lid molding papers are continuously supplied from a lid molding device to make the paper lids 200.

<Description of a method of manufacturing the paper lid of the disposable container according to the present invention>

Next, a method of manufacturing the paper lid according to the present invention configured as described above will be described with reference to FIGS. 4 to 9.

Figure 4:
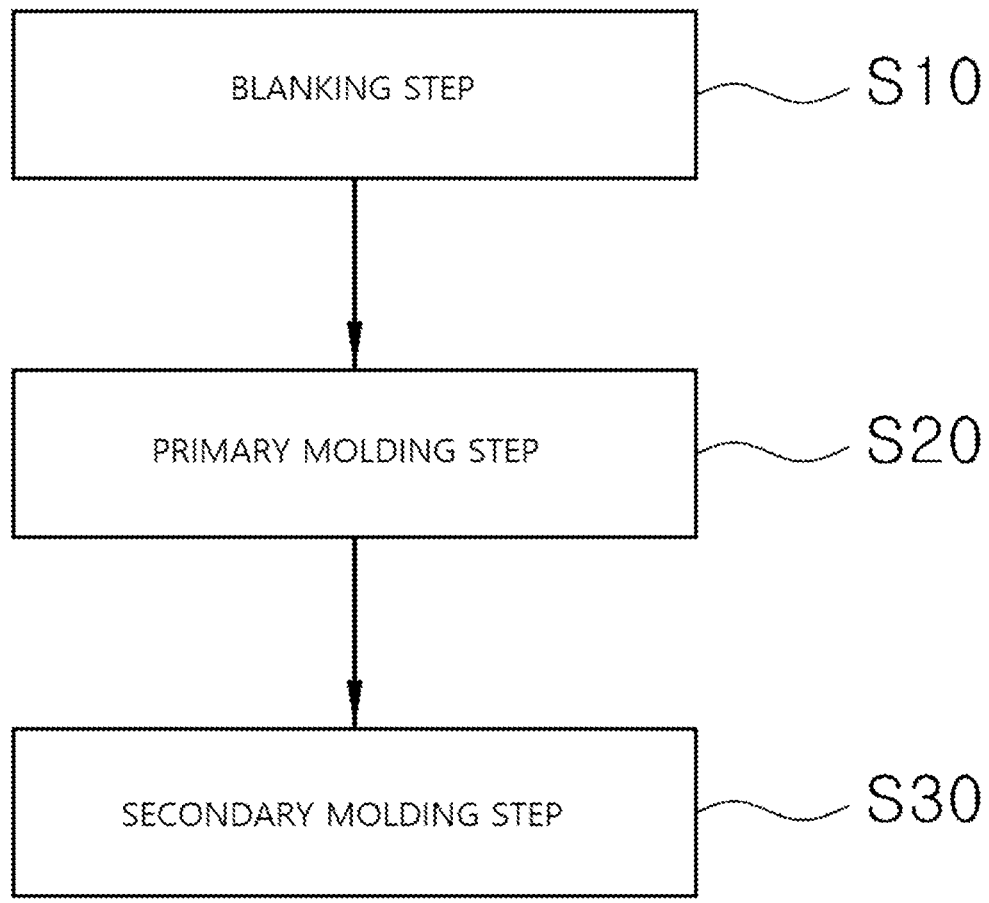
FIG. 4 is a process block diagram sequentially showing a method of manufacturing the paper lid for the food container according to the present invention.

As shown in FIG. 4, the method of manufacturing the paper lid for the food container according to the present invention includes a blanking step (S10) of cutting out, from base paper, lid molding paper having a disc shape and a size capable of forming the paper lid 200, a primary molding step (S20) of primarily molding the paper lid 200 including the cover plate 210 and the skirt wall 220 using the lid molding paper made in the blanking step (S10), and a secondary molding step (S30) of molding the curling tight-contact part 225 so as to have a round cross-sectional shape in the middle of the skirt wall 220 of the paper lid 200 made in the primary molding step (S20) and simultaneously molding the guide part 224.

Figure 5:
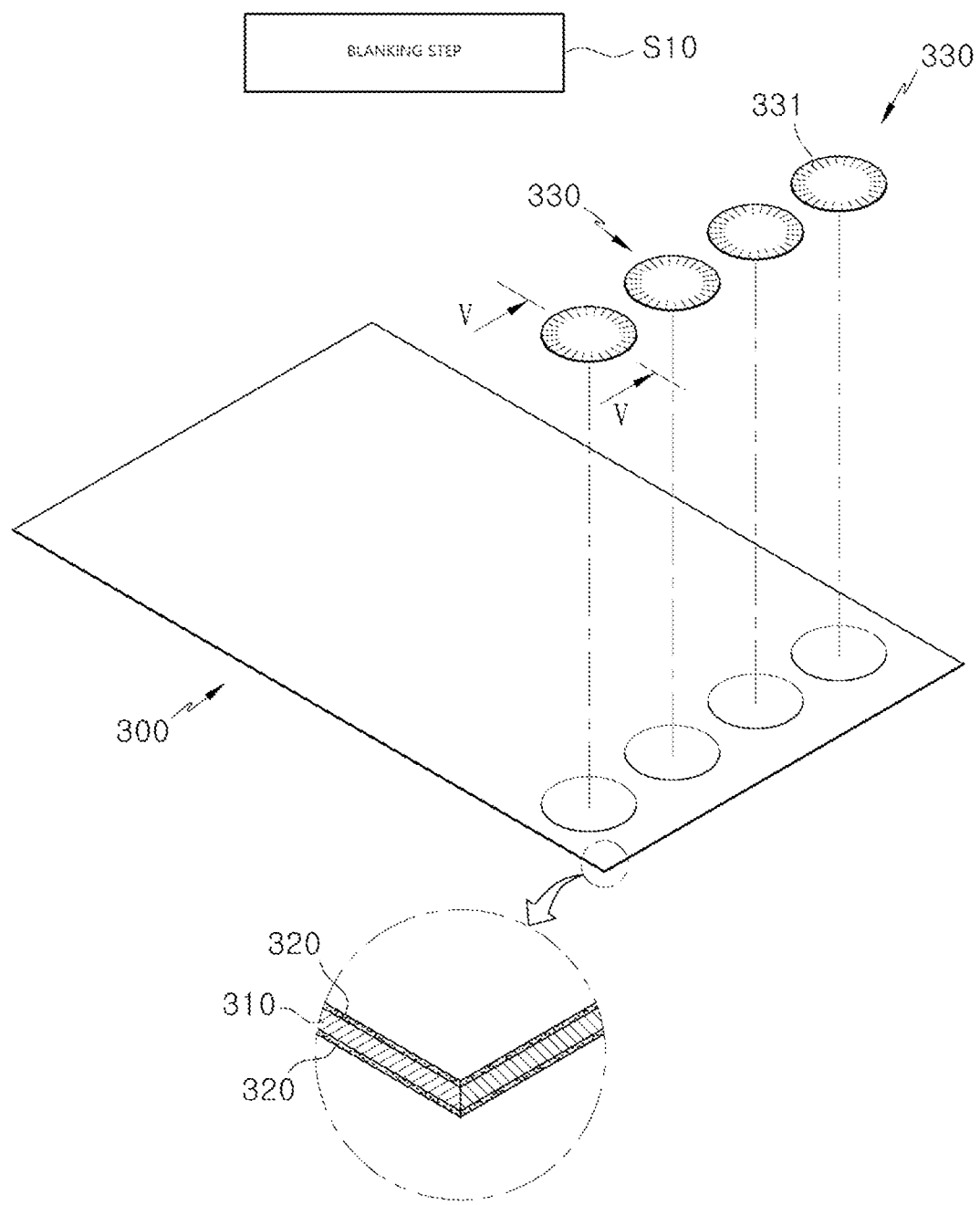
FIG. 5 is a diagram schematically showing a blanking step in the method of manufacturing the paper lid according to the present invention.

Referring to FIG. 5, the blanking step (S10) is a process of cutting out, from base paper 300, a lid molding paper 330 having a disc shape and a size capable of molding the paper lid 200. The base paper 300 uses a single-layer paper pulp 310 having upper and lower surfaces, each of which is treated with a synthetic resin coating 320 so as to prevent moisture from penetrating the base paper 300. The lid molding paper 330 having the disk shape and the size capable of molding the paper lid 200 is cut out through a wooden mold from the base paper 300 (referred to as "Thomson process"). In this process, it is preferable to radially form wrinkles 331 on the edge of the lid molding paper 330 so as to facilitate lid molding. That is, when pressure is radially applied to the edge of the lid molding paper 330 to form the wrinkles 331, the lid molding paper 330 is deformed along the wrinkles 331, thereby easily molding the paper lid 200. In the embodiment of the present invention, the base paper 300, which is a raw material of the lid molding paper 330, is the single-layer paper pulp 310, and each of the upper and lower surfaces of the paper pulp 310 is preferably treated with the synthetic resin coating 320 with a thickness of about 10 to 35 microns (μm). Additionally, the synthetic resin coating 320 treated on the base paper 300 preferably uses an eco-friendly synthetic resin material of a polymer material that is not absorbed into the body and is not harmful to health. For example, at least one of polyethylene (PE), polypropylene (PP), polylactic acid (PLA), polyethylene terephthalate (PET), or silicone may be adopted and used as the synthetic resin coating 320. This synthetic resin coating 320 has a function of not only preventing moisture from penetrating the paper pulp 310 but also facilitating molding of the paper lid 200.

Figure 6:
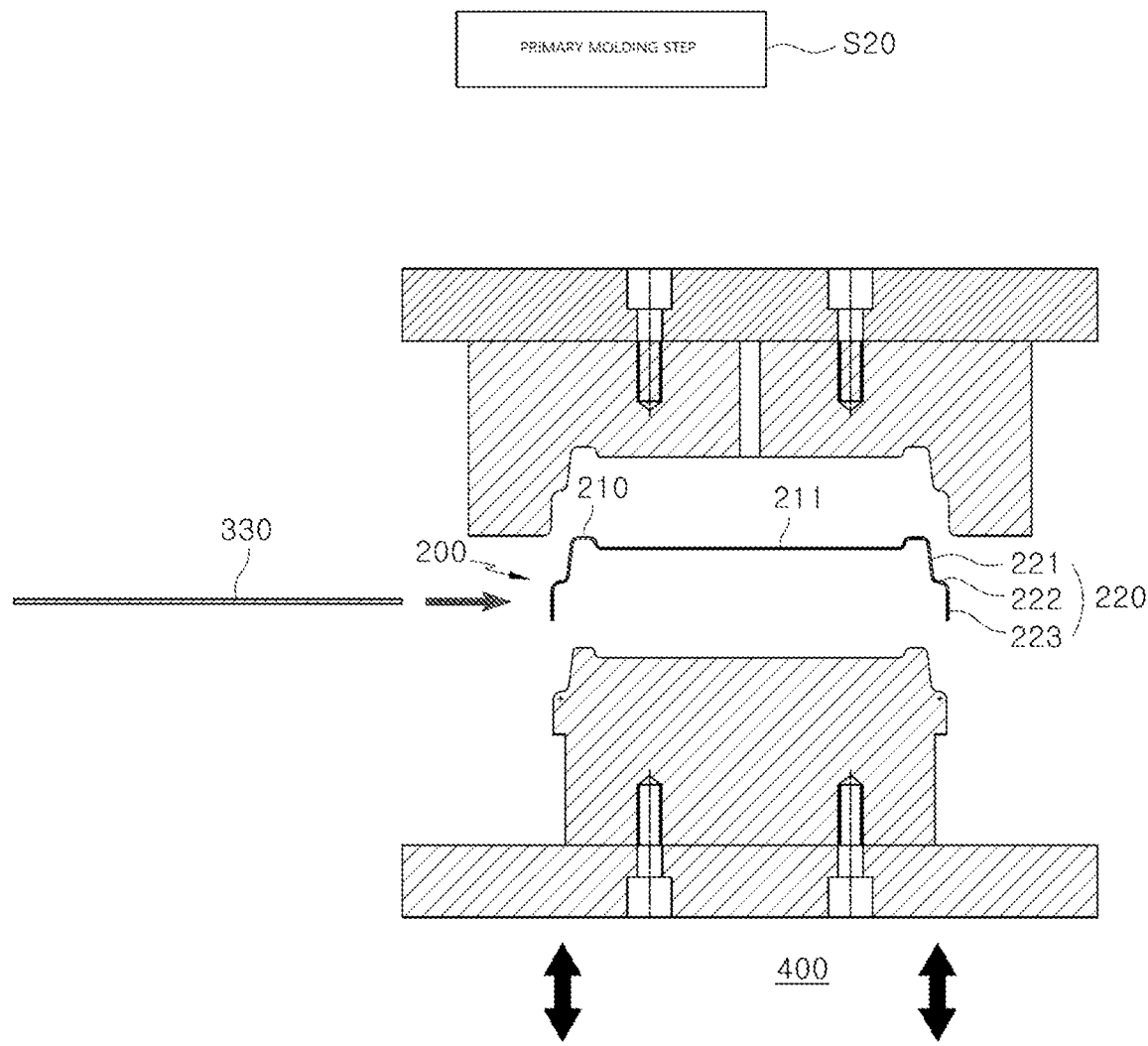
FIG. 6 is a diagram schematically showing a primary molding step in the method of manufacturing the paper lid according to the present invention and the paper lid molded in the primary molding step.

As shown in FIG. 6, the primary molding step (S20) is a process of supplying the lid molding paper 330 made in the blanking step (S10) to a primary molding device 400 and molding, while applying heat to the molding paper 330, the paper lid 200 including the cover plate 210 configured to cover an open upper portion of the food container 100 while being spaced apart from the open upper portion and the skirt wall 220 bent downwards along the edge of the cover plate 210 and coupled to the food container 100 so as to surround the outside of the reinforcement frame 111 of the food container 100. The cover plate 210 includes the cover reinforcement part 211 corresponding to the central portion of the lid molding paper 330, the cover reinforcement part 211 being formed at the central portion of the cover plate 210 and concavely recessed downwards. The cross-section of the cover plate 210 is changed by the cover reinforcement part 211 to increase bending strength (also known as flexural strength), thereby making a more durable paper lid 200. In addition, in the primary molding step (S20), the skirt wall 220 is bent to form the small diameter part 221 connected to the edge of the cover plate 210, the small diameter part 221 having the lower end thereof in contact with the upper end of the food container 100, and a large diameter part 223 formed to expand in diameter while forming a round-shaped stepped part 222 so as to allow the lower end (end) of the small diameter portion 221 to contact the upper end of the reinforcement frame 111 of the food container 100, the large diameter part 223 surrounding the outside of the uppermost end of the food container 100 while being spaced apart from the outside thereof. As described above, the wrinkles 331 are radially formed on the edge of the lid molding paper 330 in the blanking step (S10), thereby making it possible to easily mold the skirt wall 220 including the small diameter part 221 and the large diameter part 223 in the primary molding step (S20).

Figure 7:
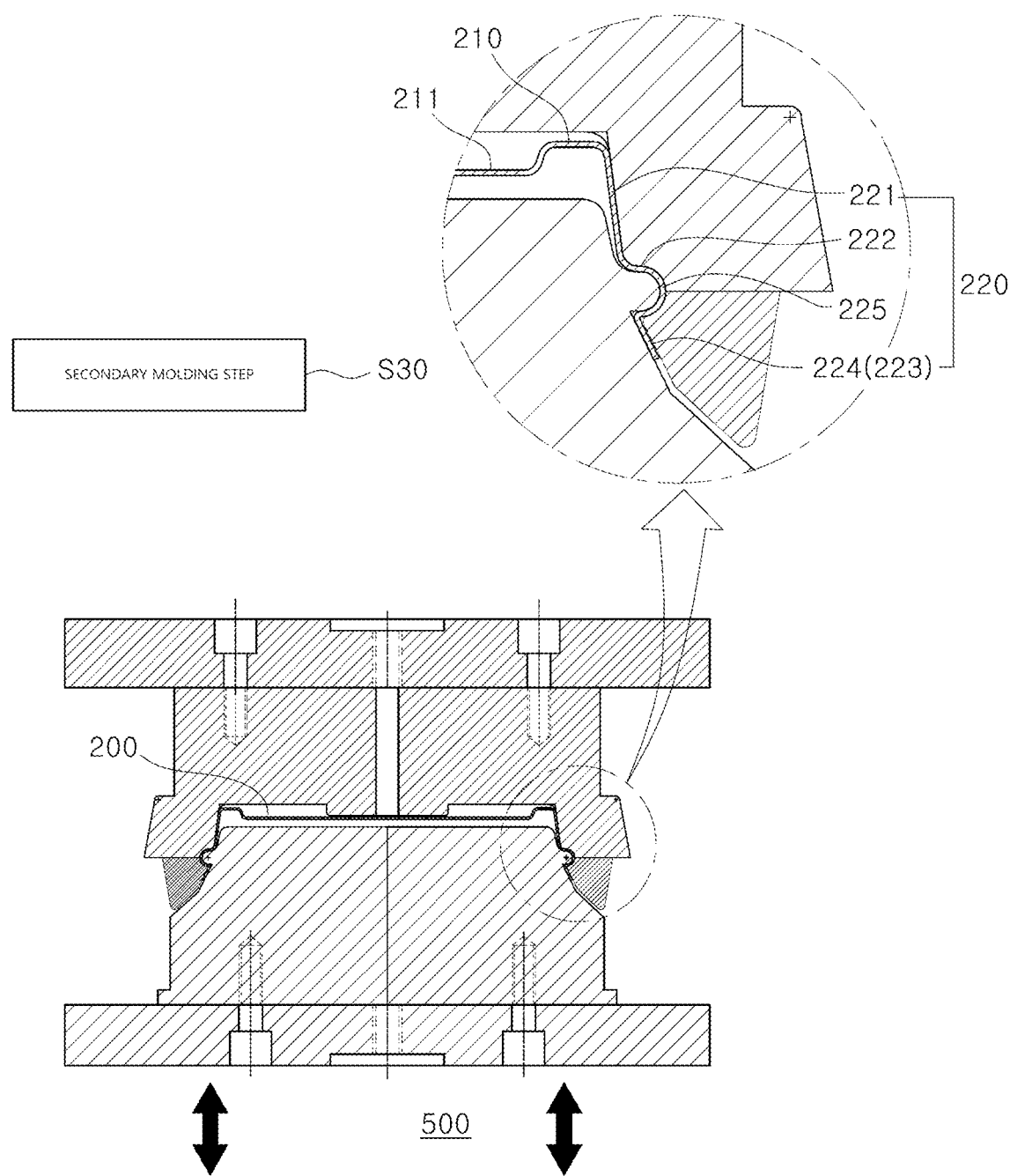
FIGS. 7 to 9 are diagrams schematically showing a secondary molding step in the method of manufacturing the paper lid according to the present invention and the paper lid molded in the secondary molding step.
Figure 8:
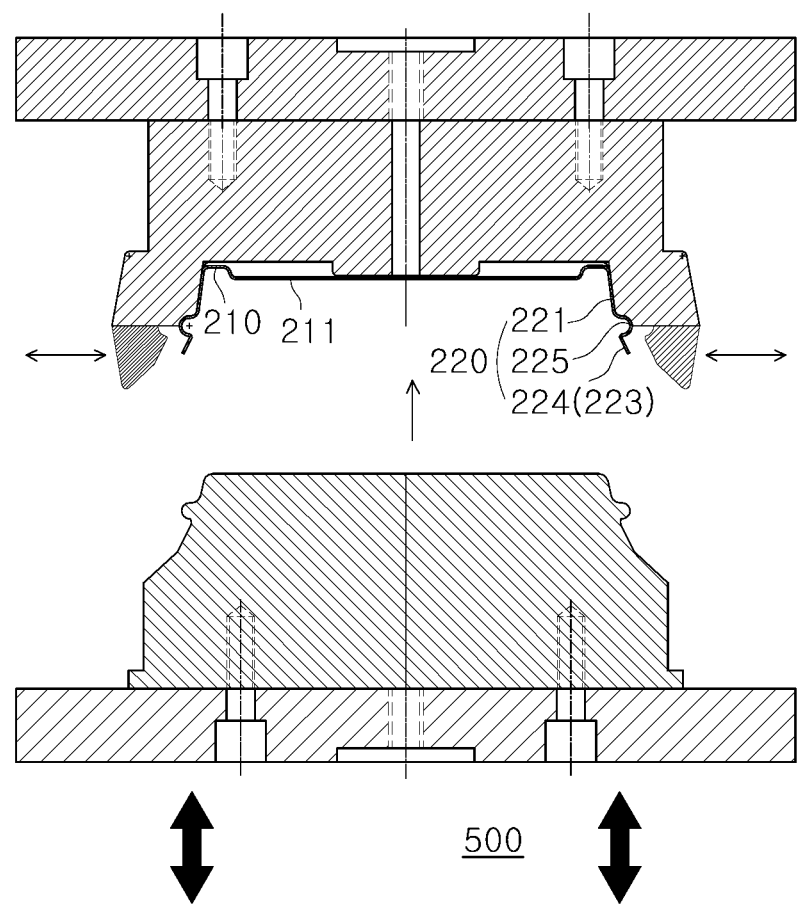
Figure 9:
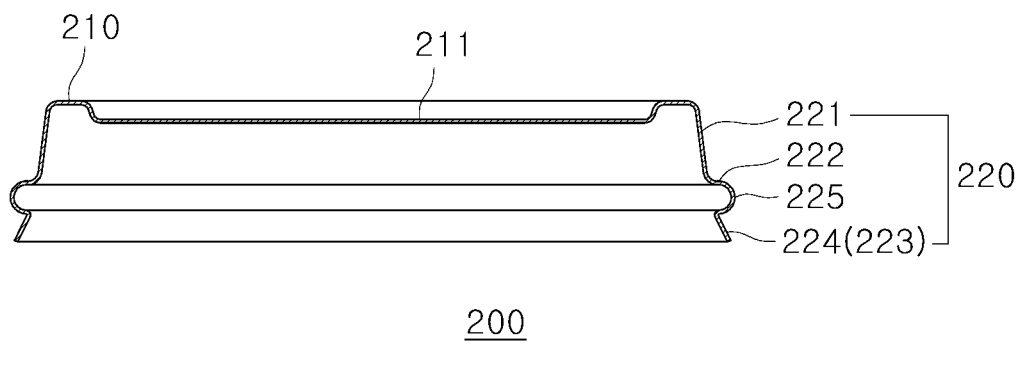

As shown in FIGS. 7 to 9, the secondary molding step (S30) is a process of moving the paper lid 200 made in the primary molding step (S20) to a secondary molding device 500, forming, while applying heat to the paper lid 200, the guide part 224 by bending the large diameter part 223 of the skirt wall 220 so as to be inclined outwards in the direction toward the lower end (end) thereof, and molding the curling tight-contact part 225 configured to tightly surround the outside of the reinforcement frame 111 of the food container 100 by curling the upper end of the guide part 224 in the inward direction so as to have a semicircular round cross-sectional shape while the upper end of the guide part 224 is connected to the round-shaped stepped part 222. The guide part 224 is provided to facilitate coupling with the upper portion of the food container 100, and it is preferable to form the guide part 224 and mold the curling tight-contact part 225 simultaneously.

Meanwhile, in the embodiment of the present invention, in the primary molding step (S20) and the secondary molding step (S30), each molding device (molds 400 and 500) is preheated to the temperature of 100° C. to 140° C. (120° C. in the embodiment) through a heater. In this heated state, it is preferable to compress the lid molding paper 330 and the paper lid 200 made primarily while applying heat thereto within the range of 0.5 to 2 seconds (one second in the embodiment) so as to plastically deform the synthetic resin coating 320. In this short-time heating compression process, the synthetic resin coating 320 treated on each of the upper and lower surfaces of the lid molding paper 330 is not damaged by heat, and when the molding of the paper lid 200 is completed, the synthetic resin coating 320 is hardened again and remains in the molded state (plastically deformed state). That is, when the molding of the paper lid 200 is completed and the synthetic resin coating 320 is cooled, the molded states of the cover plate 210, the small diameter part 221, the guide part 224, and the curling tight-contact part 225 are maintained as they are.

In more detail, as shown in FIG. 9, in the paper lid 200 made by the manufacturing method according to the present invention, the skirt wall 220 includes the small diameter part 221 configured to cause the cover plate 210 and the open upper portion of the food container 100 to be spaced apart from each other, the guide part 224 configured to expand in diameter while forming the round-shaped stepped part 222 so as to allow the lower end of the small diameter part 221 to contact the upper end of the reinforcement frame 111 of the food container 100, the guide part 224 being bent to be inclined outwards in the direction toward the end thereof so as to guide coupling between the paper lid 200 and the upper portion of the food container 100, and the curling tight-contact part 225 configured to tightly surround the outside of the reinforcement frame 111 of the food container 100 by curling the upper end of the guide part 224 in the inward direction so as to have a semicircular round cross-sectional shape while the upper end of the guide part 224 is connected to the stepped part 222.

Figure 10:
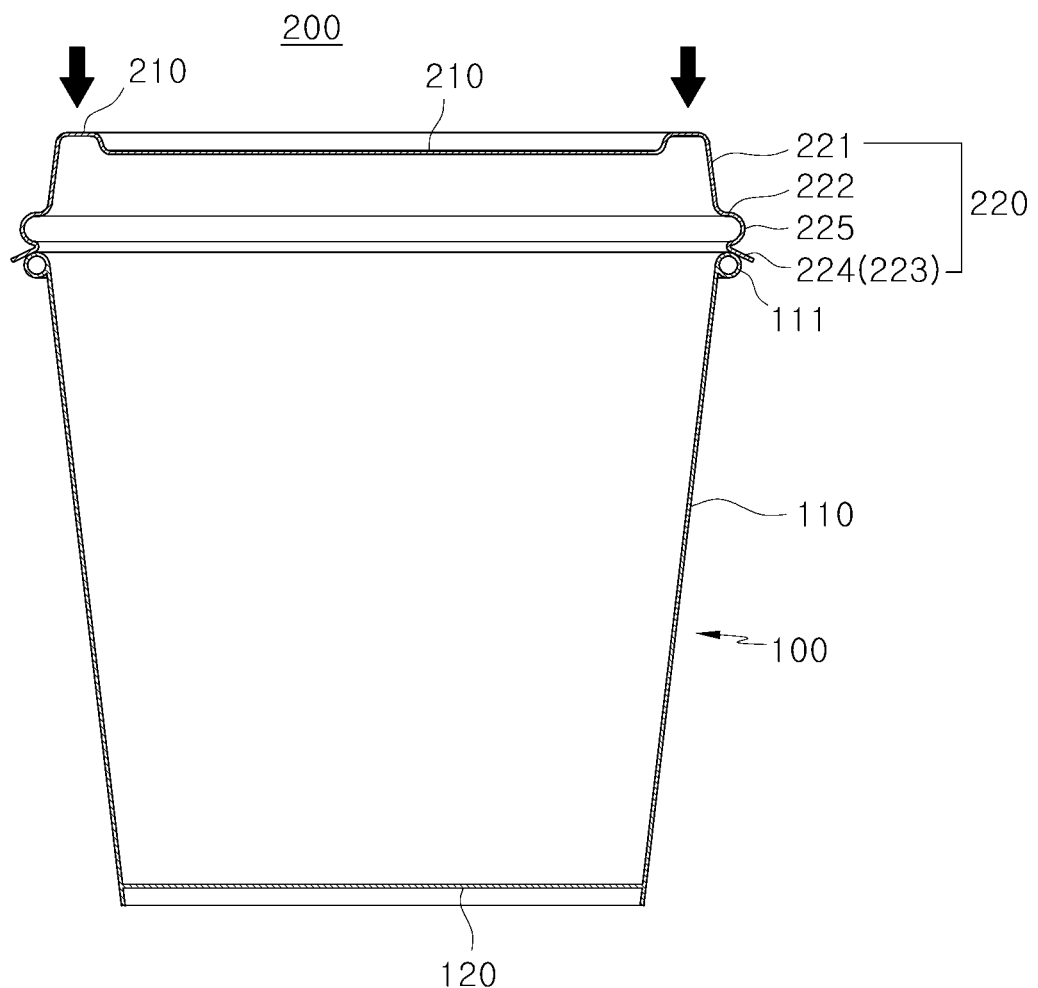
FIGS. 10 and 11 are cross-sectional views sequentially showing the process of covering the upper portion of the food container with the paper lid according to the present invention.
Figure 11:
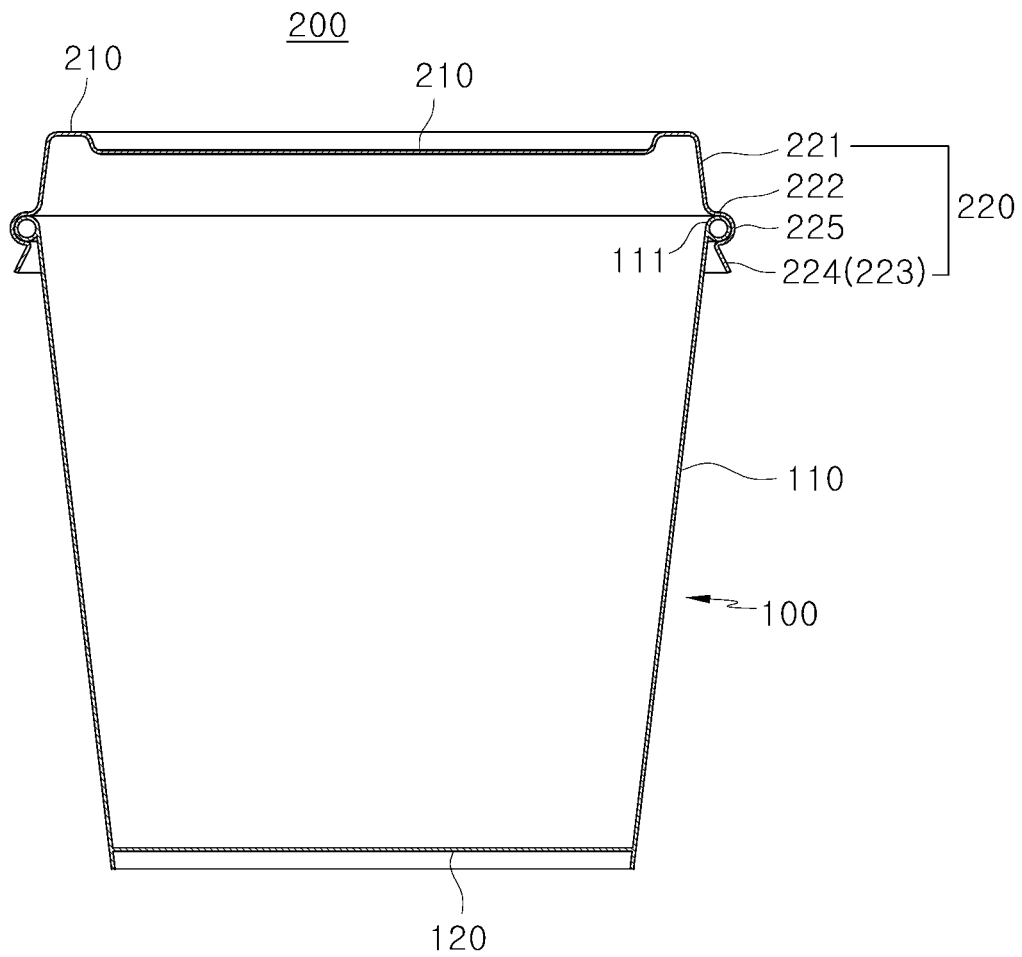

Accordingly, as shown in FIGS. 10 and 11, when the food container 100 is coved with the paper lid 200 by pressing the same from the top (refer to the direction of the arrow in FIG. 10), the curling tight-contact part 225 provided in the middle of the skirt wall 220 may stably cover the open upper portion of the food container 100 by tightly surrounding the entire outside of the reinforcement frame 111 of the food container 100. In addition, the guide part 224, formed at the edge of the skirt wall 220 and molded to be inclined outwards, has a function of allowing the paper lid 200 to smoothly cover the food container 100 downwards from the upper portion of the food container 100. According to this configuration, the paper lid 200 may also be used in the automation line to cover the food container 100 by easily pressing the same downwards from the upper portion of the food container 100.

Further, since the paper lid 200 for the food container 100 according to the present invention is manufactured while applying heat thereto at the temperature of 100° C. to 130° C. in the primary molding step (S20) and the secondary molding step (S30), the layer of the synthetic resin coating 320 is plastically deformed to be molded more easily and stably.

Additionally, in the paper plate 200 for the food container 100 according to the present invention, bending strength is increased by molding the cover reinforcement part 211 concavely recessed downwards at the central portion of the cover plate 210, thereby having an effect of further improving product reliability of the paper lid 200.

Industrial Applicability

The present invention may be widely used in the field of "a paper lid for a food container and a method of manufacturing the same", configured to increase strength of the food container by curling the edge of the paper lid using an eco-friendly paper material and to be reliably applied to the food container.

The invention claimed is:

1. A method of manufacturing a paper lid for a food container, the paper lid configured for covering an upper portion of the food container having a reinforcement frame formed at an uppermost portion of a wall surface and curled outwards so as to have a circular cross-sectional shape, the method comprising:
   a blanking step of cutting out a lid molding paper having a size capable of molding the paper lid from base paper having upper and lower surfaces, each of which is treated with a synthetic resin coating having a thickness of 10 to 35 microns, and forming wrinkles radially on an edge of the lid molding paper so as to facilitate molding of the paper lid;
   a primary molding step of supplying the lid molding paper made in the blanking step to a primary molding device, wherein the primary molding step comprises:
      compressing, while applying heat to the lid molding paper at temperature of 100° C. to 140° C., the lid molding paper within the primary molding device to mold the paper lid, such that the paper lid forms a cover plate configured to cover the open upper portion of the food container while being spaced apart from the open upper portion and a skirt wall bent downwards along an edge of the cover plate and configured to be coupled to the food container so as to surround an outside of the reinforcement frame of the food container, and
      bending the skirt wall so as to form a small diameter part connected to the edge of the cover plate, the small diameter part having a lower end configured to contact with an upper end of the food container and a large diameter part formed to expand in diameter while forming a round-shaped stepped part configured to allow the lower end of the small part to contact an upper end of the reinforcement frame of the food container, the large diameter part configured to surround an outside of the upper end of the food container while being spaced apart from the outside thereof; and
   a secondary molding step of moving the paper lid made in the primary molding step to a secondary molding device, wherein the secondary molding step comprises:
      forming, while applying heat to the paper lid at temperature of 100° C. to 140° C., a guide part by bending the large diameter part of the skirt wall so as to be inclined outwards in a direction toward a lower end thereof, the guide part configured to guide a coupling with the upper portion of the food container, and
      molding a curling tight-contact part configured to surround the outside of the reinforcement frame of the food container by curling an upper end of the guide part an inward direction so as to have a semicircular round cross-sectional shape while the upper end thereof is connected to the round-shaped stepped part.

2. The method according to claim 1, wherein the synthetic resin coating is made of at least one of polyethylene (PE), polypropylene (PP), polylactic acid (PLA), polyethylene terephthalate (PET), or silicone.

3. The method according to claim 1, wherein the primary molding step further comprising molding a cover reinforcement part being concavely recessed downwards at a central portion of the cover plate.

\* \* \* \* \*